G. H. PEAL.
TEA BALL.
APPLICATION FILED JUNE 6, 1916.
1,209,485.
Patented Dec. 19, 1916.
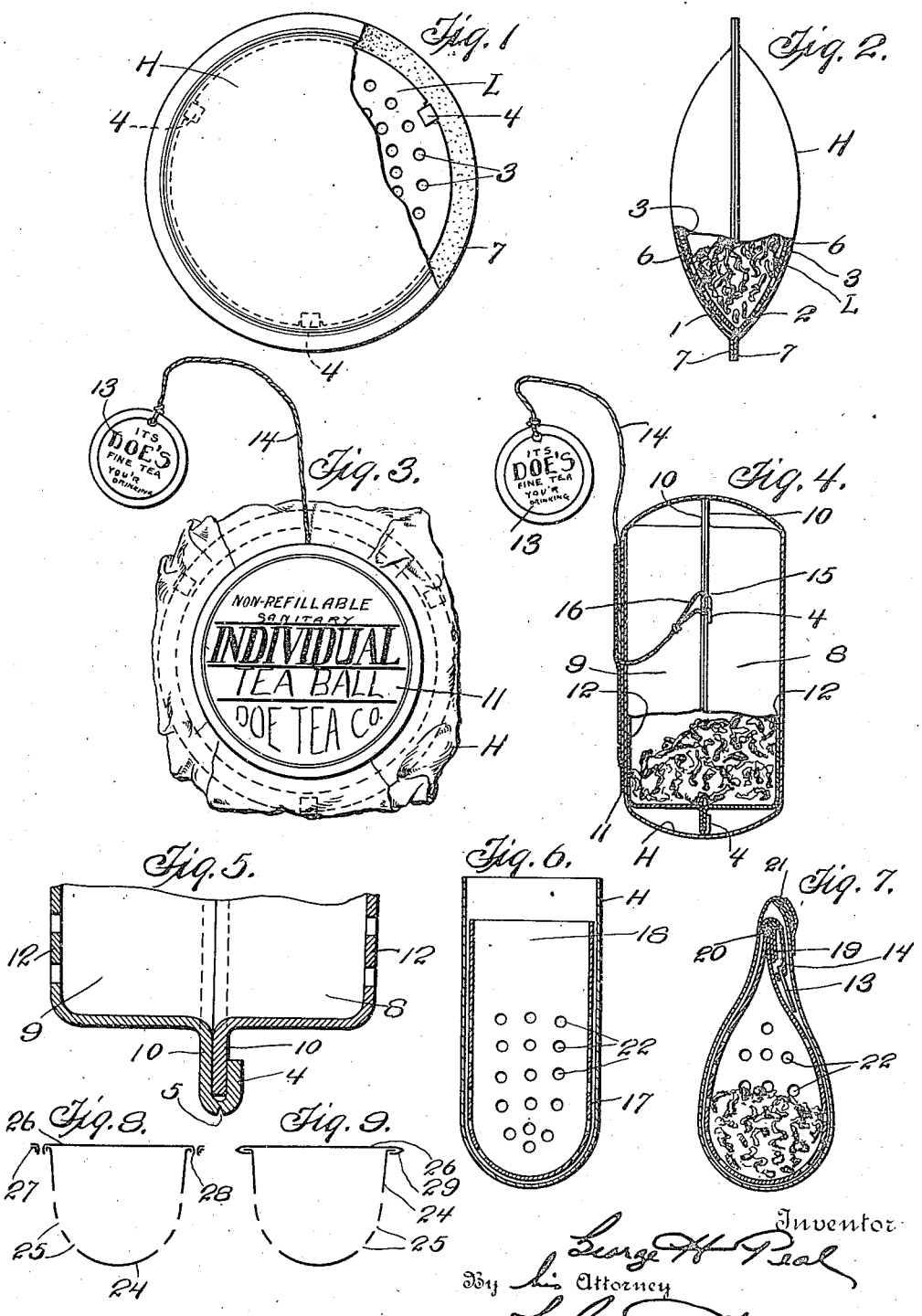

UNITED STATES PATENT OFFICE.

GEORGE H. PEAL, OF RUTHERFORD, NEW JERSEY.

TEA-BALL.

1,209,485.  Specification of Letters Patent.  Patented Dec. 19, 1916.

Original application filed July 23, 1914, Serial No. 852,560. Divided and this application filed June 6, 1916. Serial No. 101,895.

*To all whom it may concern:*

Be it known that I, GEORGE H. PEAL, residing at Rutherford, in the county of Bergen and State of New Jersey, have invented certain new and useful Improvements in Tea-Balls, of which the following is a specification.

This invention is a division of my copending application, Serial No. 852,560, and relates to a non-refillable tea ball.

The object of this invention is to provide a simple and attractive article of manufacture in the form of a tea ball which is non-refillable and which is intended to contain just sufficient tea for a single brewing and to carry the tea into the brewing pot, and by means of which the exhausted tea leaves may be wholly withdrawn from the brewing pot after the brewing operation is completed, the tea ball with the exhausted tea leaves to be discarded after the brewing operation.

A further object is to provide a tea ball for use as indicated, of such construction and formation that it will be efficient and thoroughly practical for its purpose and at the same time may be manufactured at very small cost, and in which the quality and cleanliness of the tea will be preserved.

A further object is to provide a simple and practical means for preventing the re-filling of the tea ball either before or after the brewing operation, and to provide for the attachment of an advertising device, and to provide means whereby the position of the tea ball within the brewing pot may be manually altered at will, or by which the tea ball may be lowered into or taken out of the brewing pot.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention: Figure 1 is a plan view of a completed tea ball or package constructed in accordance with the provisions of this invention, parts being broken away so as to better disclose the construction. Fig. 2 is an edge view of the structure shown in Fig. 1, parts also being broken away for better disclosing the structure. Fig. 3 is a view similar to that shown in Fig. 1, but illustrating a modification. Fig. 4 is a transverse sectional view taken upon the plane of line IV—IV of Fig. 3. Fig. 5 is an enlarged detail view of a portion of the structure shown in Fig. 4; and Figs. 6 and 7 illustrate a further modification. Figs. 8 and 9 are diagrammatic views illustrating further modifications.

Referring to the drawings for a detailed description of the structure illustrated therein, and particularly to the structures of Figs. 1 and 2, the reference character L indicates the container, and the reference character H indicates a suitable cover therefor, which cover is not claimed herein except in so far as it constitutes one form of a means for closing the perforations of the container to preserve the quality of the tea, etc. The container is made up of two halves, as 1 and 2. It may be made of any suitable material, but is preferably formed from thin sheet metal so as to maintain its shape and size either within or without the brewing pot, and metal being properly prepared to prevent corrosion, and being preferably sterilized.

The reference numeral 3 indicates perforations formed through the material of the halves 1 and 2 for facilitating the brewing.

In order to hold the halves 1 and 2 together, a suitable number of tongues 4 is provided, said tongues being adapted to form an interlocking engagement between the halves. It is intended that these tongues shall be of such a nature as to be fully capable of holding the halves together, but that they shall be incapable of being bent to release the halves and of being again bent to re-connect the halves. They are intended to be of such fragile nature that they will break off rather than stand such double bending. If necessary, they may be scored, as illustrated at 5, in Fig. 5, or otherwise treated to accomplish this result. It may be noted that in case any one of the tongues should become broken, the remainder would be ineffective to retain the halves together.

The cover is preferably shaped so as to fit snugly over the container. For this purpose it may be made of two halves as 6—6, such halves being formed with flanges 7 for engaging together. A suitable adhesive may be provided upon the abutting surfaces of the flanges 7 for sealing said flanges permanently together.

The snug fit of the halves 6 over the surface of the container, as clearly seen in Fig. 2, enables the halves 6 to efficiently close the pores or perforations of the container. The tea is thereby prevented from sifting through the perforations. The quality of the tea is preserved, and the container is maintained clean and free from contamination from outside influences. I prefer, that the cover be made of paper so that when it is desired to brew the tea which is within the container, the cover may be readily torn off and the container with the tea be immersed in hot water. The adhesive material upon the flanges 7 is intended to hold said flanges so that it becomes practically impossible to release them from each other without destroying or badly defacing the same.

The tea ball or package may be manufactured either with or without a cover and may be vended for individual use. The consumer may purchase one or more packages, according to requirements, tear off the cover and proceed to brew the tea by dropping the container into hot water. When the brewing operation is completed the container with the used tea is discarded. The consumer is assured that the tea is as clean and in as good condition as it was the day it left the factory.

Referring to the modification Figs. 3 to 5, the container is made of a pair of cup-shaped members 8 and 9, said members having laterally projecting flanges 10 thereon arranged in engagement with each other. The tongues 5 in this modification are formed as extensions from one of the flanges and are bent around so as to overlap the other flange, as clearly indicated. By this arrangement it is necessary to bend the tongues more sharply than in the structure of Figs. 1 and 2. Likelihood of the tongues to break when unbent is thus more pronounced. By making the score or groove 5 at a point midway of the bend, as shown in Fig. 5, it becomes practically impossible to unbend the tongues without breaking them. The package is thus almost positively non-refillable, especially since, as above pointed out, it is only necessary that one tongue break in order to render the remainder ineffective. In this modification also the cover is given a different form. It consists of a paper member folded about the container and having its edge portions caught down and sealed together by a separately formed sealing paster 11, which is pasted in position. In order to render this form of the cover effective for retaining the tea against sifting through the perforations of the container, the container is preferably perforated only through its opposite flat surfaces 12 where the material of the cover naturally lies flush and smooth thereover. It may be noted also that, if desired, one of the halves 8 or 9 might be made simply as a flat disk instead of as a cup-shaped member as illustrated. This would reduce the area of the container. In this modification also a tag 13 is illustrated in combination with the device, said tag being connected to a string or wire 14 which leads through the cover and into fixed connection with the container, as clearly illustrated in Fig. 4, the point of attachment to the container being indicated by the reference numeral 15. The manner of attaching the cord 14 may take any form, but preferably consists in making the string 14 with a loop 16 therein disposed so that one of the sealing members or tongues 4 projects therethrough. The string 14 with the tag 13 constitutes a convenient means for handling the package prior to the removal of the cover, and it also constitutes a convenient and efficient means for manipulating the container after the cover has been removed. For instance, it may be employed as a handle member to lower the container into a brewing pot and for raising the container from the brewing pot after the brewing operation is completed, or for moving the container about within the brewing pot the tag 13 meanwhile having been left hanging over the upper edge of the brewing pot. If desired, of course, the tag 13 and the string 14 may be held entirely within the cover at all times until the cover is removed. By this means the cord would be maintained in a clean and sanitary condition more suitable for entering the brewing pot, in the manner described. The sealing paster may be employed as an advertisement carrying medium, as illustrated, if desired.

In the modification shown in Figs. 6 and 7, the container, as 17, is made up of very thin sheet metal and is shaped somewhat like an ordinary paper bag its upper end, as 18, being open. After the tea has been placed within the container the upper end is folded together and bent over upon itself, as clearly shown at 19 in Fig. 7. The folded over portions may be crushed tightly together so that a very sharp bend occurs, as at the point 20, in the material. It is intended that the material of the container shall be of such a fragile nature that it will break at the point of the bend 20 if an attempt is made to straighten out said bend. The cover in this modification is made of paper and is bag-shaped so as to fit closely over the container and its upper end is also lapped upon itself, as indicated at 21, the lapping portions being permanently pasted together so that the only means of access to the container will be by first destroying the cover. The container is, of course, provided with perforations, as 22. These perforations, however, are carefully arranged so as to appear upon portions of the container which are most closely covered by portions of the cover, so that sifting of the tea through perforations will be avoided as far as possible. A tag and cord, as described with reference to Figs. 3 to 5, may be used in connection with this modification also, if desired. Such a tag and cord may also be used in connection with the structure shown in Figs. 1 and 2, if desired. When applying the tag and cord to the structure of Figs. 6 and 7, the loop 16 of the cord would preferably be made to receive the turned over portion 19 of the container. It may, however, be connected in some other manner, if desired.

The modifications Figs. 8 and 9 illustrate the container only. The cover, if used, may be of any desired construction, either along the lines above pointed out in connection with the other figures, or otherwise. In these modifications the container is made up of a cup-shaped lower portion 24, which is perforated as at 25, to facilitate the brewing operation. A top part 26 is provided, the same being fixed to the upper edge of the cup-shaped portion.

In the modification Fig. 8, the cup-shaped portion is provided with an annular flange 27 at its upper edge and the top part overlies said flange, the cover part and flange being punctured in such manner that portions of the top part extend through and form an interlocking engagement with portions of the flange as clearly indicated at 28. It will be apparent that it is practically impossible to detach the top part and to again return it for repeated use. The cover part may be perforated, if desired.

In the modification Fig. 9, the cup-shaped part is formed with a flange similar to that of Fig. 8, and the top part has its marginal portion bent over and about said flange, as clearly illustrated at 29. Here also it is practically impossible to detach the cover part and to again return it to attached position for repeated use. This is due particularly in this instance to the nature of the material used and to the sharpness of the bend of the flange 29. The material, preferably aluminum foil, is of such a brittle nature that it will break when unbent. The top part in this modification also may be perforated, if desired.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

1. As a new article of manufacture, a dispensing and brewing package for tea or the like adapted to contain and protect the tea and to carry the tea into the brewing pot and to continue to confine the tea during the entire brewing operation and thereafter and to be withdrawn from the brewing pot after the brewing operation is completed with the exhausted tea still confined, said new article of manufacture comprising a perforated insoluble container adapted to contain a quantity of tea or the like sufficient for a single brewing, and said container having means formed integrally therewith of a character to render the container non-refillable, except by rupture of a part of the container, whereby the container may not be refilled without detection.

2. As a new article of manufacture, a dispensing and brewing package for tea or the like adapted to contain and protect the tea and to carry the tea into the brewing pot and to continue to confine the tea during the entire brewing operation and thereafter and to be withdrawn from the brewing pot after the brewing operation is completed with the exhausted tea still confined, said new article of manufacture comprising a perforated insoluble container adapted to contain a quantity of tea or the like sufficient for a single brewing, said container having an integral bendable portion bent for sealing the container, and said bendable portion being disruptable and being adapted to be disrupted if unbent, whereby to render the container non-refillable except with detection.

3. As a new article of manufacture, a dispensing and brewing package for tea or the like adapted to contain and protect the tea and to carry the tea into the brewing pot and to continue to confine the tea during the entire brewing operation and thereafter and to be withdrawn from the brewing pot after the brewing operation is completed with the exhausted tea still confined, said new article of manufacture comprising a perforated insoluble container adapted to contain a quantity of tea or the like sufficient for a single brewing, said container having means formed integrally therewith of a character to render the container non-refillable except by rupture of a part of the container, whereby the container may not be refilled without detection, and removable means for at least partially closing the perforations of the container to preserve the quality of the tea.

4. As a new article of manufacture, a dispensing and brewing package for tea or the like adapted to contain and protect the tea and to carry the tea into the brewing pot and to continue to confine the tea during the entire brewing operation and thereafter and to be withdrawn from the brewing pot after the brewing operation is completed with the exhausted tea still confined, said new article of manufacture comprising a perforated insoluble container adapted to contain a quantity of tea or the like sufficient for a single brewing, said container being formed of at least two parts, connected together by means rendering the container non-refillable except with detection, said means comprising a plurality of locking elements, said locking elements being spaced apart and being correlated to each other and to the container so that each is dependent upon the others for its effectiveness.

5. As a new article of manufacture, a dispensing and brewing package for tea or the like adapted to contain and protect the tea and to carry the tea into the brewing pot and to continue to confine the tea during the entire brewing operation and thereafter and to be withdrawn from the brewing pot after the brewing operation is completed with the exhausted tea still confined, said new article of manufacture comprising a perforated insoluble container adapted to contain a quantity of tea or the like sufficient for a single brewing, said container having means formed integrally therewith of a character to render the container non-refillable except by rupture of a part of the container, whereby the container may not be refilled without detection, and a separately formed handle member fixed to said container by said last mentioned means.

6. As a new article of manufacture, a dispensing and brewing package for tea or the like adapted to contain and protect the tea and to carry the tea into the brewing pot and to continue to confine the tea during the entire brewing operation and thereafter and to be withdrawn from the brewing pot after the brewing operation is completed with the exhausted tea still confined, said new article of manufacture comprising a perforated insoluble container adapted to contain a quantity of tea or the like sufficient for a single brewing, said container being formed of at least two parts connected together by connecting means rendering the container non-refillable except with detection, said connecting means comprising a plurality of integral disruptable locking elements, and said locking elements being spaced apart and being correlated to each other and to the container so that each is dependent upon the integrity of the others for its effectiveness.

In testimony whereof I affix my signature in the presence of two witnesses.

GEORGE H. PEAL.

Witnesses:
L. GESSFORD HANDY,
GUSTAV GENZLINGER.